April 21, 1964     T. L. FAWICK     3,129,982
OIL WELL PIPE AND CASING PROTECTOR
Filed July 5, 1960     2 Sheets-Sheet 1
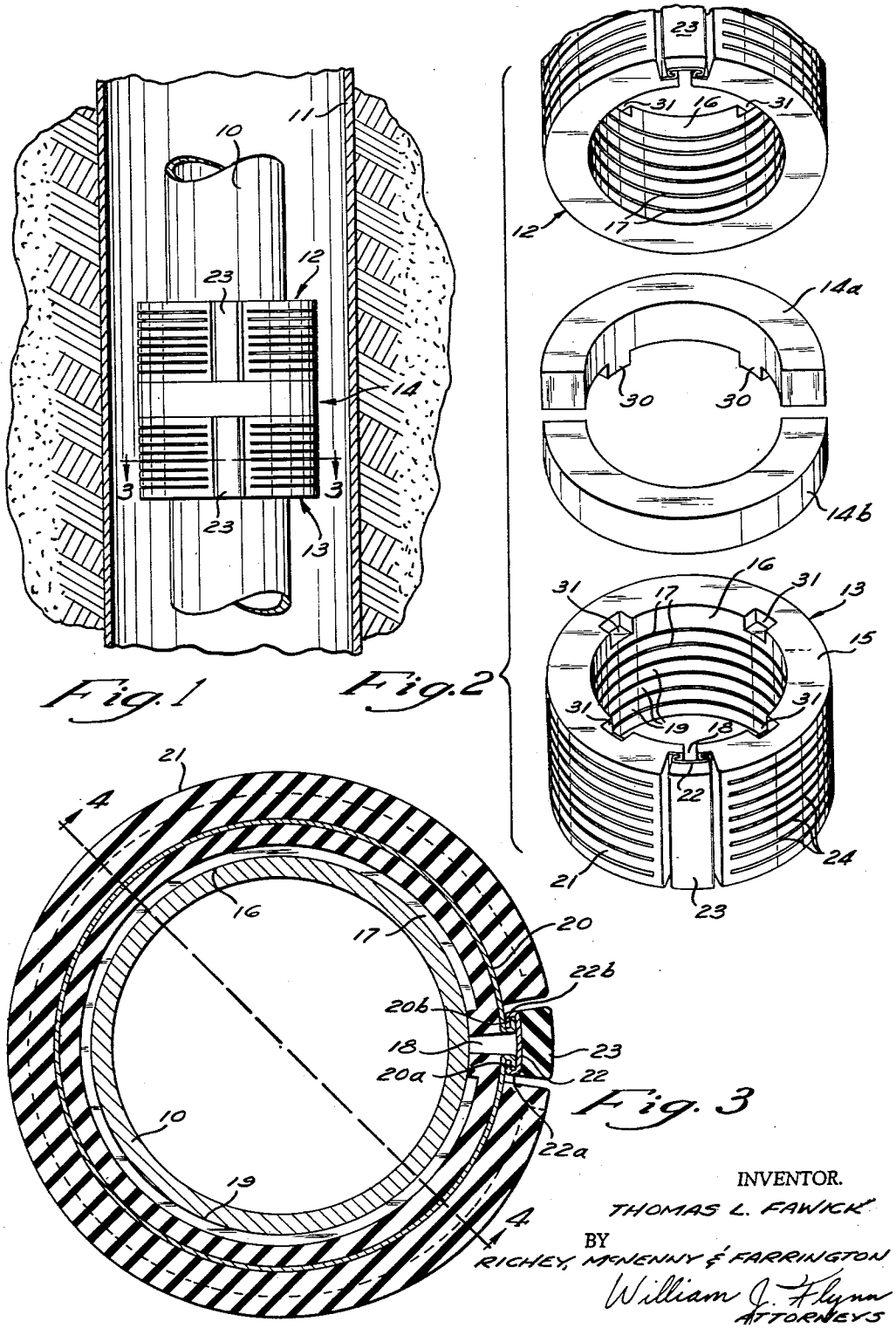
INVENTOR.
THOMAS L. FAWICK
BY
RICHEY, McNENNY & FARRINGTON
William J. Flynn
ATTORNEYS April 21, 1964     T. L. FAWICK     3,129,982
OIL WELL PIPE AND CASING PROTECTOR Filed July 5, 1960     2 Sheets-Sheet 2

INVENTOR.
THOMAS L. FAWICK
BY
RICHEY, McNENNY, & FARRINGTON
William J. Flynn
ATTORNEYS United States Patent Office 3,129,982
Patented Apr. 21, 1964

3,129,982
OIL WELL PIPE AND CASING PROTECTOR
Thomas L. Fawick, Cleveland, Ohio, assignor to Fawick Corporation, Cleveland, Ohio, a corporation of Michigan
Filed July 5, 1960, Ser. No. 40,895
3 Claims. (Cl. 308—4)

This invention relates to a pipe and casing protector for oil wells.

In pumping oil from underground deposits, it is the usual practice to provide a large diameter casing which extends down into the earth and a smaller diameter pipe extending lengthwise down through the casing and spaced from the wall of the casing. Because of its extreme length the pipe is comparatively flexible and, because of the forces to which it is subjected during the pumping operation, the pipe is apt to bump against the casing, which may result in damage to the pipe or to the casing, or both.

To prevent this, various arrangements have been proposed heretofore for protecting the pipe and the casing under such circumstances. Generally speaking, such protectors have been thick rings of rubber or the like mounted on the pipe at spaced locations along its length and serving as shock-absorbing bumpers for engagement with the casing wall when the pipe is forced laterally within the casing. A serious defect of previous protectors of this general type has been their tendency to lose their grip and slip down along the pipe due to the lubricating action of the liquid to which they are exposed in the casing. Another practical disadvantage of such prior pipe protectors has been the length of time required to mount such a protector on the pipe, particularly when the protector has to be slipped over the enlargement constituted by the joint between two successive sections of the pipe.

The present invention is directed to a novel pipe protector which is free of these disadvantages and which, therefore, constitutes an advantageous and more practical arrangement for protecting an oil well pipe and casing.

Accordingly, it is an object of this invention to provide a novel and improved oil well pipe and casing protector.

Another object of this invention is to provide such a protector having novel provision which insures against its slipping any substantial extent down along the pipe.

Another object of this invention is to provide such a protector which can be rapidly and conveniently mounted on, or removed from, the pipe.

Further objects and advantages of this invention will be apparent from the following detailed description of a presently-preferred embodiment thereof, which is illustrated in the accompanying drawings.

In the drawings:

FIG. 1 is a fragmentary vertical axial section through an oil well casing having a pipe therein with the protector assembly of the present invention mounted on the pipe;

FIG. 2 is an exploded perspective view of the pipe protector assembly shown on the pipe in FIG. 1;

FIG. 3 is a cross-sectional view taken along the line 3—3 in FIG. 1; and

Figure 4:
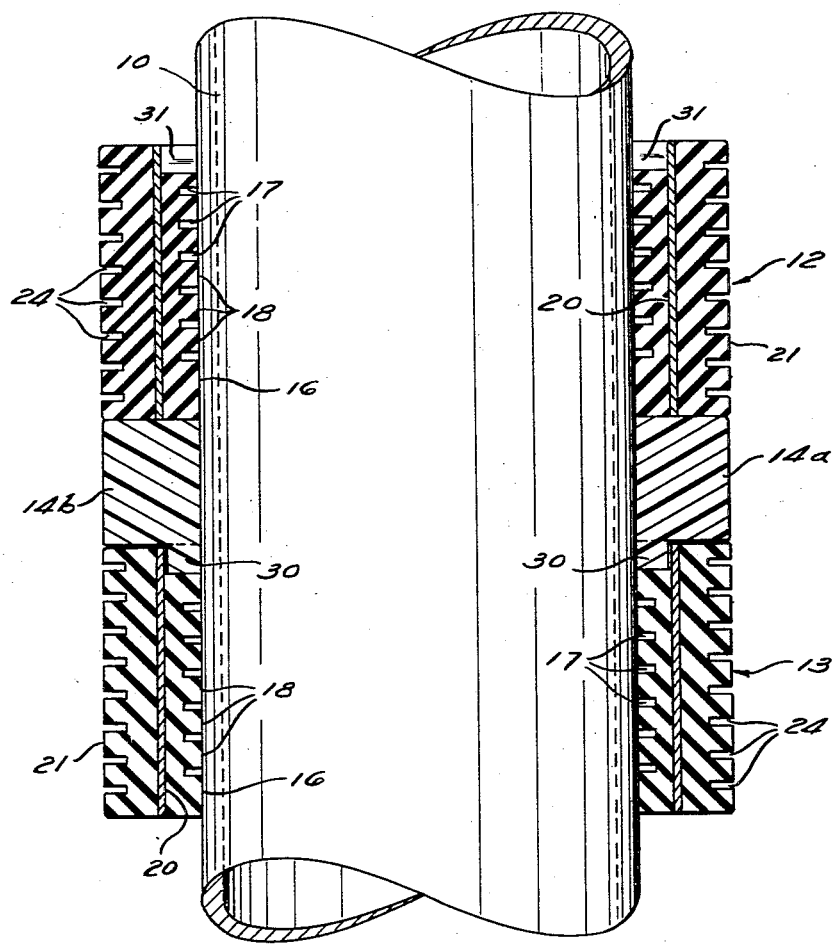
FIG. 4 is a section taken along the line 4—4 in FIG. 3.

Referring first to FIG. 1, a protector assembly in accordance with the present invention is shown mounted on a pipe 10 inside an oil well casing 11. In practice, the casing and the pipe may extend a considerable distance down into the earth and consequently the pipe is quite flexible over its entire length. The protector assembly in FIG. 1 comprises a pair of shock-absorbing ring units 12 and 13 separated by arcuate spacers 14.

Referring to FIG. 2, the lower ring unit 13 includes a split ring body 15 of rubber, rubber-like material, or other suitable material having a high coefficient of friction and adequate shock-absorbing characteristics. The wall of the split ring has an appreciable radial thickness, which may be of the order of one inch in one practical embodiment. The axial length of the split ring is several times its wall thickness.

In accordance with the present invention the generally cylindrical inside wall 16 of the split ring is formed with a plurality of axially spaced grooves 17 which run circumferentially around the inside of the ring. Each of these grooves is open at the inside of the split ring 15. As best seen in FIG. 3, each of the internal grooves 17 terminates at each end short of the lengthwise gap 18 in the wall of the split ring. Between each pair of neighboring grooves 17 the ring presents generally cylindrical lands 19, each of which has a substantially greater extent lengthwise of the ring than does each groove.

As shown in FIG. 3, a band of steel 20 or other suitable material is embedded in the split ring wall mid-way between its inside surface 16 and its outside surface 21. The band 20 is surface bonded, such as by vulcanization, to the rubber-like material of the split ring body. Preferably the band extends substantially the full length of the split ring body. At its opposite ends the band terminates in outwardly projecting hook-shaped extremities 20a and 20b which are positioned at the opposite sides of the gap 18 in the split ring body. The material of the split ring is removed at the outside in the vicinity of these hook-shaped extremities, leaving them exposed.

A detachable retainer is provided for engagement with these hooked ends of the band 20 to hold the split ring 15 contracted. As best seen in FIGS. 2 and 3, this retainer comprises a rigid plate 22 having hook-shaped ends 22a and 22b for engagement respectively inside the hooked ends on band 20. The plate 22 is provided with a piece 23 of rubber-like material on the outside. When the split ring 15 is contracted by a suitable tool the retainer plate 22 may be slid lengthwise into interfitting engagement with the hooked ends 20a and 20b of the band 20 in the split ring, or may be slidably removed therefrom in the same manner.

In the use of this protector, before the retainer plate 22 has been applied, the split ring body 15 may be expanded so that it can be applied to the pipe 10. After being mounted on the pipe, the split ring body 15 then is contracted by a suitable conventional manual tool so as to bring the hooked ends 20a and 20b close to each other. Then the retainer plate 22 is slid lengthwise of the split ring into the position shown in FIG. 3 in which it holds the ends of the split ring toward each other to maintain the split ring tightly contracted on the pipe 10.

The presence of the internal grooves 17 in the split ring body prevents any substantial slippage of the present protector down along the pipe as follows:

If any lubricating liquid gets between the outside of the pipe 10 and the lands 19 on the inside of the split ring body, the lubricating action of this liquid would tend to cause the split ring body to slip down along the pipe. However, if any such slippage should occur, the wiping action of the lands 19 against the pipe causes such liquid to be wiped into the grooves 17, leaving the lands dry and effective to exert maximum friction against the pipe. Therefore, only a slight amount of slippage can take place, at most, and such slippage as may occur automatically corrects the condition which caused the slippage (by wiping the liquid into the grooves 17).

Another aspect of this invention is directed to the reduction of wear on the outside of the protector. It will be apparent that repeated bumping or rubbing of the split ring body 15 against the casing wall will tend to produce wear on the outside 21 of the protector. In the present invention such wear is minimized by enhancing the deformability of the outside of the protector body. This is accomplished by providing in the protector body a plurality of axially spaced, circumferentially extending, external grooves 24. Preferably, the ends of these grooves terminate short of the gap in the split ring body. Due to the presence of these grooves, the exterior of the protector body is made up of a plurality of relatively short circumferential sections which are comparatively readily deformable when the protector body engages the wall of the casing. As a consequence, the resultant wear on the outside of the protector body is much less than it would be in the absence of the external grooves. In the latter event the exterior of the protector body would be much more rigid and less readily deformable and, therefore, more subject to abrasive wear.

While the split ring body as thus far described may be used by itself to serve as a protector for the pipe and casing, it is convenient and desirable to provide a pair of such units in an assembly as shown in FIG. 1. There the upper and lower individual split rings 12 and 13 are separated by a pair of half rings 14a and 14b of nylon or other suitable material. Each of these half rings is formed with a pair of integral depending lugs 30 which fit snugly in complementary recesses 31 formed in the top of the lower split ring 13 at the inside. With this arrangement the half rings 14a and 14b may be applied individually to the pipe 10 and slid down along the pipe until their lugs 30 fit in the recesses 13 in the lower split ring 13 to provide a unitary assembly. The lower end of the upper split ring 12 simply rests on top of these half-rings 14a and 14b in the completed assembly, as shown in FIG. 1.

The upper protector unit 12 is identical to the already described lower protector unit 13, except that no recesses corresponding to the recesses 31 in the lower unit need be provided.

From the foregoing, it will be apparent that the specific protector arrangement illustrated in the accompanying drawings is particularly well suited for the accomplishment of the stated purposes of the present invention, being adapted for ready application to the pipe and being free of any tendency for slippage to any substantial extent along the pipe. However, while a presently-preferred embodiment of this invention has been shown and described, it is to be understood that various modifications, omissions and refinements which depart from the disclosed embodiment may be adopted without departing from the spirit and scope of this invention.

What is claimed is:

1. In combination with an oil well pipe inside a casing, a protector assembly comprising upper and lower split rings of rubber-like material extending around the outside of the pipe, each of said split rings having a plurality of axially spaced internal grooves therein which run circumferentially around the inside of said split ring and which are open thereat, and retaining means detachably mounted on each split ring and holding the latter contracted against the pipe, the lower split ring having upwardly facing recesses in its upper end, and a pair of half rings engaged between the lower end of the upper split ring and the upper end of the lower split ring, said half rings having depending lugs which are snugly received in said recesses in the upper end of the lower split ring.

2. A well pipe and casing protector comprising a split ring of rubber-like material shaped and dimensioned to extend snugly around the outside of a well pipe in a casing and having a lengthwise gap therein at one side of the ring, said split ring having a substantial radial thickness and having a substantially greater axial length than its radial thickness, said ring having a plurality of axially spaced grooves running circumferentially around the inside of the ring and open at the inside of the ring, each of said grooves being narrow axially of the split ring, said ring having at its inside surface a plurality of cylindrical lands disposed between said grooves and each having an axial extent substantially greater than that of the neighboring grooves, said ring having embedded therein and bonded to the rubber-like material of the ring a continuous one-piece metal band which extends around the axis of the ring and terminates in radially outwardly turned rigid hooked opposite ends which are exposed on the opposite sides of the gap at the radially outward side of the ring, and a retaining member bridging said gap at the radially outward side of the ring and having rigid hooked portions which engage inside said hooked ends of the band to hold the split ring contracted, said clamping member being slidable lengthwise in said gap in the split ring for attachment to or detachment from the split ring, said split ring being expandable manually for insertion around the pipe when said retaining member is detached.

3. The protector of claim 2 wherein said split ring of rubber-like material has a plurality of axially spaced external grooves therein which are open at the outside of the ring and each of which extends circumferentially substantially completely around the outside of the ring.

References Cited in the file of this patent

UNITED STATES PATENTS

| | | |
|---|---|---|
| 1,938,822 | Ferlin | Dec. 12, 1933 |
| 1,965,730 | Williams | July 10, 1934 |
| 1,974,546 | Shipley | Sept. 25, 1934 |

FOREIGN PATENTS

| | | |
|---|---|---|
| 306,760 | Great Britain | Feb. 28, 1929 |
| 499,505 | Canada | Jan. 26, 1954 |
| 811,793 | Great Britain | Apr. 15, 1959 |